United States Patent Office 3,539,649
Patented Nov. 10, 1970

3,539,649
PREPARATION OF CYCLOPARAFFINS FROM CORRESPONDING CYCLOOLEFINS
Manfred Reich, Marl, Germany, assignor to Chemische Werke Huels A.G., Marl, Germany
No Drawing. Filed Sept. 1, 1967, Ser. No. 664,962
Claims priority, application Germany, Sept. 3, 1966, C 40,011
Int. Cl. C07c 5/14, 5/16
U.S. Cl. 260—666        12 Claims

ABSTRACT OF THE DISCLOSURE

Hydrogenation of cycloolefins having in excess of eight ring carbon atoms to the corresponding saturated ring compounds is effected quantitatively with a nickel catalyst on a kieselguhr support having an internal surface area of from 0.01 to less than 1 square meter per gram.

Applicant hereby claims the benefit of the filing date of German patent application C 40,011 IVb/12 o filed Sept. 3, 1966, pursuant to the provisions of 35 U.S.C. 119.

BACKGROUND OF THE INVENTION

Field of the invention

This invention relates to the hydrogenation of cycloolefins using hydrogen and a nickel catalyst on a special support.

The preparation of cycloparaffins by a catalytic hydrogenation of mono- or polyunsaturated cycloolefins is known. In general, noble metal catalysts, such as palladium or platinum dioxide-containing catalysts or nickel catalysts, which may be modified, are employed for this purpose.

Technical difficulties are encountered in the known procedures, and these mount with an increase in the size of the ring system and with an increase in the number of double bonds present. With an increased number of double bonds, polymerizations occur more readily during the course of the hydrogenation due to the highly exothermic nature of the reaction. Furthermore, a high proportion of by-products generally results from the isomerization of rings having more than six ring members. The by-products are removed only at high cost, if at all.

Description of the prior art

German Pat. 767,317 relates to a process for the production of cycloparaffins by the catalytic hydrogenation of cyclopolyolefins in either the liquid or the gaseous phase at elevated pressure in the presence of iron, cobalt, nickel or copper catalysts. In this process, the yields are unsatisfactory.

An improvement is obtained by the process of German Pat. 1,028,991 with respect to the production of cyclooctane by hydrogenating cyclooctatetraene at elevated temperature and under elevated pressure under neutral conditions with a manganese-containing nickel-copper catalyst, optionally in the presence of solvents. This process, however, requires a subsequent distillation of the hydrogenation product in order to obtain pure cyclooctane.

According to German Pat. 1,066,580, cyclopolyolefins of 8 and more ring carbon atoms are hydrogenated in the gaseous phase at normal pressure with catalysts deposited on supports having relatively large pores. The pore diameter of the support material is no less than 1000 A., and the internal surface of the support material is about 1 to 10 m.$^2$/g. When applying the process to the hydrogenation of cyclooctatetraene, cyclooctane is obtained in almost quantitative yields. However, in the hydrogenation of cyclododecatriene-1,5,9 to cyclododecane, a hydrogenation product is obtained having a melting point of only 45° C. to 50° C. (as compared to the melting point of 64° C. of pure cyclododecane) and a content of only about 98% of cyclododecane. It is also necessary in this process to add a distillation step for further purification.

The continuous preparation of cyclododecane by the hydrogenation of cyclododecatriene-1,5,9 is possible according to French Pat. 1,373,772, wherein the hydrogenation is conducted in the liquid phase with nickel catalysts under pressure. By adding rather large amounts of diluents, particularly cyclododecane, and by maintaining a relatively low temperature, isomerization to by-products is suppressed. However, it is impossible to obtain a pure hydrogenation product, as indicated by the melting point of 60° C. set forth in the example.

Objects of the invention

It is, therefore, an object of this invention to provide an improved process, as well as an improved catalyst composition which facilitates the production of cycloparaffins, particularly those having more than 8 carbon atoms.

Upon further study of the specification and claims, other objects and advantages of the present invention will become apparent.

SUMMARY OF THE INVENTION

An improved process has now been discovered for the production of cycloparaffins having more than eight ring carbon atoms and which can optionally contain functional groups. Whereas there is no reason why the process should be restricted in any way by an upper limit in the number of ring carbon atoms, it is nevertheless preferred that the number of carbon atoms in the ring system be not more than about 30, more preferably not more than 20 especially not more than 16.

The process is a catalytic hydrogenation of the corresponding mono- or polyunsaturated cycloolefins in the presence of supported catalysts containing nickel as the hydrogenation-effecting component, wherein the improvement is obtained by the utilization of a catalyst support having an internal surface of from 0.01 to $<1$ m.$^2$/g.

The very small internal surface area of the support is critical and is suitably obtained by sintering the support material by means of a high temperature treatment. A preferred support material is sintered kieselguhr with which a small amount, particularly up to 10% by weight, of alkali and/or alkaline earth compounds are advantageously admixed. The sintering step at, for example, 1000° C., reduces the internal surface area to below 1 m.$^2$/g. Alternative suitable supports are other sintered, silicic-acid-containing substances, such as precipitated silicic acid, and also pumice or bentonite, or baked clay particles, or aluminum oxide made inactive by high-temperature treatment, so long as the internal surface of these substances is less than about 1 m.$^2$/g.

The internal surface is determined in accordance with the so-called BET method (Brunauer, Emmett, and Teller, J. Am. Chem. Soc., 60 (1938), p. 309). The surface of the support material, determined according to this method, ranges preferably between 0.05 and 0.9 m.$^2$/g. and most advantageously about 0.2 to 0.7 m.$^2$/g.

The preferred support material—a sintered kieselguhr containing small amounts of compounds of sodium, iron, calcium and magnesium, especially the oxides—is commercially available under the name "stuttgart mass." Often the support material has a surface area above 1 m.$^2$/g. In a sintering step carried out at about 1000° C. for some hours the surface area is reduced. The time of heating generally is about 4 to 6 hours, but it is not critical since the surface area of a sample of the support material is controlled during the sintering step after cooling said sample.

The cycloolefinic starting materials of this invention can contain up to the maximum of its ring carbon atoms double bonds. Exemplary of the starting materials are cyclononene, cyclononadiene-(1,2), cyclononadiene-(1,3), cyclononadiene-(1,4), cyclononatriene-(1,2,6), cyclodecene, cyclodecadiene-(1,5), cyclodecadiene-(1,6), cyclodecatriene-(1,2,6), cyclodecatetraene-(1,2,6,7), cycloundecene, cyclotridecene, cyclotridecadiene-(1,2), cyclotridecadiene-(1,3), cyclotridecatetraene-(1,2,6,10), cyclotetradecadiene-(1,8), cyclopentadecene, cyclohexadecene, cyclohexadecadiene-(1,3), cyclohexadecadiene-(1,9), cyclohexadecatetraene-(1,3,9,11), especially cyclododecene, cyclododecadiene-(1,3), cyclododecadiene-(1,5), cyclododecadiene-(1,7), cyclododecatriene-(1,5,9) in its cis and trans configurations, which are possible.

From these cycloolefins the subject process produces the corresponding saturated ring compound (cycloparaffin), e.g., cycloalkanes having from 9 to 30 ring carbon atoms, such as cyclononane, cyclodecane, cycloundecane, cyclotridecane, cyclotetradecane, cyclopentadecane, cyclohexadecane and additional higher saturated ring compounds, particularly cyclododecane. The products have the same size rings as the starting materials, but lack the unsaturation.

Also multiple-ring carbocyclic compounds, e.g. bi-, tri-, and tetracyclic compounds, can be produced according to the subject process from the corresponding multiple-ring, i.e., having the same number, size, and position of rings, compound having at least one olefinic double bond. Exemplary bicyclic products and their unsaturated precursors are: bicyclo-(0,3,5)- decane from bicyclo-(5,3,0)-deca - 2,4,6,8,10 - pentaene; and bicyclo - (3,2,2) - nonane from bicyclo-(3,2,2)-6,8-nonadiene. Tricyclic compounds prepared according to this invention are, e.g., tricyclo-(3,2,1,1$^{3,8}$)-nonane from 1,5-methanopentalene.

In the same manner, tetracyclic saturated compounds are prepared from their olefinically unsaturated counterparts.

Whether or not the starting unsaturated compound has one or multiple double bonds or one or more rings, ring carbon atoms can be substituted. Substituents can be, e.g., alkyl groups (preferably lower alkyl, especially those having from 1 to 4 carbon atoms); hetero-atom-containing functional groups which are difficult to reduce, such as hydroxyl and amino, e.g. primary amino, mono(lower)-alkylamino (methylamino) and di(lower)alkylamino (diethylamino); and readily reducible hetero-atom-containing functional groups, such as nitro, nitroso, peroxy, hydroperoxy, and epoxy. The readily reducible groups are transformed to their reduced counterparts, corresponding to the reducing capability of the catalyst, e.g. to stable amino or hydroxyl groups.

Exemplary substituted products and the starting materials from which they are prepared according to this invention are: 1,5,9-trimethyl-cyclododecane from 1,5,9-trimethylcyclododecatriene-(1,5,9) or 3,7,11-trimethyl-cyclododecatriene - (1,5,9); 1 - ethyl-cyclododecane from 1-ethyl-cyclododecene; 1-butyl-cyclododecane from 1-butyl-cyclododecene; 1-hexyl-cyclododecane from 1-hexyl-cyclododecene; cyclononanol from cyclononene-(2)-ol-(1); cyclododecanol from cyclododecene-(2),ol-(1) or 9,10-epoxy-cyclodecadiene-(1,5) or 3-hydroperoxy-cyclodecatriene-(1,5,9); cyclododecanediol-(1,2) from cyclododecadiene-(5,9)-diol-(1,2); 2 - amino-cyclododecanol-(1) from 2-amino-cyclododecadiene-(5,9)-ol-(1).

Accordingly, the term "cycloparaffins," in connection with the cycloparaffins producible in accordance with the process of this invention, is to be understood to mean pure hydrocarbons, as well as cycloparaffins substituted by functional groups; corresponding considerations also apply for the cycloolefins employed in this process.

The nickel content of the supported catalysts is suitably on the order of 0.1 to 30% by weight, particularly between 3 and 15% by weight, based on the total weight of the catalyst, including the support. If desired, the catalysts can additionally contain modifying agents, such as chromium, magnesium or zinc. The modifiers are generally present in amounts of 0.1 to 30% by weight, particularly 0.5 to 15% by weight, based on the total weight of the catalyst, including the support. When a low hydrogenation pressure is employed for a relatively high charge on the catalyst, the hydrogenation may not be complete by one or several tenths of one percent. In such a case, the hydrogenated product is immediately conducted, without any intermediate treatment, over a conventional palladium-supported catalyst. This post treatment is effected in the same reaction chamber and under the same conditions. The proportion of the palladium catalyst with respect to the total volume of catalyst is suitably about 1/20 to 1/3. Suitable palladium catalysts are those with aluminum oxide or charcoal as the support. The palladium content of these catalysts is about 0.05 to 2% by weight of palladium. No specific dimensions are required for the inner surface of the support for the palladium catalysts. As a matter of fact, this combination catalyst can be highly advantageous by permitting the use of lower hydrogenation pressures of about 0 to 20 atmospheres (gauge), and cycloolefin/catalyst throughputs of about 30 to 300 g./h. and l./catalyst volume.

The nickel catalysts of this invention are prepared, for example, by applying an aqueous nickel salt solution to a support substance. Such a solution can have ammonia admixed therewith for better dissolution, and can contain, if desired, other additives, such as chromic acid, magnesium salts, or zinc salts.

The nickel salt and the optional additive can be affixed to the support with the aid of auxiliary materials, such as water glass, particularly in case of poor solubility, e.g., when they are present in the form of dispersions. Suitable nickel salts are, for example, nickel formate, nickel carbonate, nickel acetate, and nickel nitrate. The support is suitably in the form of tablets, pastilles or broken pieces of an average diameter of about 2 to 10 mm. The catalyst is subjected, in a conventional manner, to a reducing hydrogen treatment at about 100 to 300° C. before it is used and after, if desired, a thermal treatment of about 6 to 12 hours rising up to 400° C., e.g., to decompose nitrates.

The temperature conditions of the process depend upon the degree of unsaturation of the compound employed and upon the hydrogen pressure available. The hydrogenation temperature ranges normally between 120 and 300° C., in particular between 150 and 250° C. At higher hydrogen pressure, this temperature can be somewhat lower. For example, a temperature of about 180° C. may be employed at a hydrogen pressure of 30 atmospheres, but at lower hydrogen pressure, this temperature must be somewhat increased, for example, at a hydrogen pressure of 1 atmosphere, about 240° C.

The hydrogenation pressure can be any desired amount; for example, depending upon the hydrogenation pressure employed, it can range between 1 and 250 atmospheres absolute. If the amount of gas passed through the catalyst bed is sufficiently large, the pressure can also be even higher. Advantageously, pressures between 2 and 30 atmospheres are employed, but pressures below and above this range are also suitable. The process is preferably conducted in the gaseous phase, but it can also be carried out as long as at least part of the product is still present in the gaseous phase.

The catalyst/olefin proportion amounts to about 30 to 300 g./hour of cycloolefin to be hydrogenated per liter of catalyst volume. The catalyst charge is dependent on the extent of unsaturation of the compound employed and upon the hydrogen pressure during the hydrogenation, i.e., the charge can be larger, the less unsaturated the starting compound and the higher the hydrogen pressure.

In the zone of low hydrogenation pressures, up to about 20 atmospheres gauge, particularly advantageously in the range between 0 and 5 atmospheres gauge, the catalyst charge can be increased by adding the above-mentioned supported palladium catalysts.

The saturated ring compounds produced according to the present process in a continuous mode of operation are very pure without additional post-treatment, thus eliminating any need for distillation. The content of aromatic isomerization products is so negligible, i.e., below 0.001%, that it cannot be determined by conventional analysis. Even after the catalyst is used for months, there is no decrease in the quality of the hydrogenation products.

A further advantage of the process is that isomerizations of even those cycloolefins which have a strong tendency to isomerize, such as those having a ring of 12 carbon atoms, are practically completely suppressed. Furthermore, the temperature never becomes uncontrollable, a danger which is particularly prevalent with cycloolefins having a high degree of unsaturation.

The cycloparaffins produced by this invention are useful for many purposes, such as solvents, fuels or additives for fuels, especially rocket fuels.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following example, the sintered kieselguhr was produced by the following technique:

A mixture of about 86% by weight of kieselguhr, about 5% by weight aluminum oxide, about 5% by weight sodium carbonate, about 1% by weight potassium carbonate and about 3% by weight calcium carbonate is heated to about 1000° C. for about 6 hours in a muffle furnace. After cooling the sintered mass is broken in parts of about 5 to 8 mm. diameter and the surface area is determined according to the BET method. If the determined area is above 1 m.$^2$/g., the sintering step is repeated.

Example 1.—At a temperature of 220° C. and an operating pressure of 15 atmospheres absolute, there are passed through a tube of 1 liter of particulate catalyst 110 g./h. of cyclododecatriene-1,5,9 (purity as determined by gas chromatography: 99.8%; 96.0 cis, trans, trans, and 3.8% trans, trans, trans), which had previously been vaporized, together with 1,500 N l./h. of hydrogen. Thereafter, while still under pressure, condensation is effected in a cooling system maintained at 65° to 70° C. (the melting point of the cyclododecane produced is 64° C.).

The catalyst contains 8% by weight, based on the total weight of the supported catalyst, of nickel on sintered kieselguhr as support material. It is prepared by applying to the support a corresponding amount of nickel from an ammoniacal-aqueous solution containing 3% of nickel formate. The resultant support is then subjected to a hydrogen stream at 150° C., with the temperature rising to 200° C. during the course of 12 hours.

The sintered kieselguhr has an internal surface of 0.5 m.$^2$/g. (BET method); in addition to small amounts of other impurities, it contains about 5% Al$_2$O$_3$, about 3% Na$_2$O, about 0.6% K$_2$O, and about 1.4% CaO, and is present in irregular pieces having an average diameter from about 3 to 8 mm.

The condensed product is cyclododecane having a melting point of 64° C. and a purity, as determined by gas chromatography, of 99.8%. The conversion is quantitative, and no by-products occur. Aromatic compounds (UV analysis) are undetectable (less than 0.001%).

After three months' operation, no decrease in the catalyst activity is observed.

Replacing the cyclododecatriene with the same number of mols per hour of either cyclononadiene-(1,4) or cyclononatriene-(1,2,6) results in the preparation, in similar manner, of an equally high yield of cyclononane.

Example 2.—Repeating the process of Example 1 with a catalyst containing 2% by weight of chromium in addition to 8% by weight of nickel in place of the catalyst described in said example (all other conditions being identical), results in a quantitative conversion to cyclododecane having a purity (determined by gas chromatography) of 99.8%. No aromatic compounds are detectable.

The catalyst containing 2% chromium and 8% nickel is prepared from chromic acid and nickel formate in an ammoniacal aqueous solution as in Example 1.

Following the procedure and employing the catalyst of Example 2, but replacing the cyclododecatriene with the same number of mols per hour of either 1,5,9-trimethyl-cyclododecatriene-(1,5,9) or 3,7,11-trimethyl-cyclododecatriene-(1,5,9) results in the preparation of an equally high yield of 1,5,9-trimethyl-cyclododecane. Suitable the hydrogenation of the trimethyl-cyclododecatrienes is carried out at a temperature of 240° C. and the amount of hydrogen is increased to about 2000 N l./h.

Example 3.—At a temperature of 240° C. and an operating pressure of 0.1 atmosphere gauge, 50 g./h. of cyclododecatriene-1,5,9 (purity as determined by gas chromatography: 99.8%; 96.0% cis, trans, trans and 3.8% trans, trans, trans), which had previously been vaporized, together with 300 N l./h. of hydrogen, are passed through a tube packed with 1 liter of the catalyst defined in Example 1. (The unconsumed hydrogen is recycled.) Thereafter, while still under pressure, the product is condensed in a cooling system maintained at 65° to 70° C.

The condensed product is cyclododecane having a melting point of 63° C. and a purity, as determined by gas chromatography, of 99.7%. (Only traces of cis- and trans-cyclododecene are found.)

Replacing the cyclododecatriene with the same number of mols per hour of bicyclo-(5,3,0)-deca-2,4,6,8,10-pentaene and adding cyclohexane as a solvent results in the preparation, in similar manner, of an equally high yield of bicyclo-(0,3,5)-decane.

Example 4.—A a temperature of 240° C. and an operating pressure of 0.1 atmosphere gauge, 80 g./h. of cyclododecatriene-1,5,9 (described in Example 1), which had previously been vaporized, together with 300 N l./h. of hydrogen, are passed through a tube having a volume of 1 liter. The upstream ⅘ of the volume is packed with the catalyst defined in Example 1; the downstream ⅕ of said volume is packed with a supported palladium catalyst, the palladium of which is 0.5% by weight and the support of which is aluminum oxide. The palladium catalyst is prepared by applying to the support a corresponding amount of palladium from a solution of palladium chloride in hydrochloride acid. After drying the resultant support it is subjected to hydrogen stream at about 200° C. The condensed cyclododecane has a purity, as determined by gas chromatography, of 99.8%. The melting point is 64° C. The conversion and the yield are quantitative. Following the procedure of this example, but replacing the cyclododecatriene with the same number of mols per hour of either cyclohexadecadiene-(1,9) or cyclohexadecatetraene-(1,3,9,11) results in a quantitative yield, in similar manner, of cyclohexadecane.

Example 5.—Repeating the procedure of Example 3, but substituting for the cyclododecatriene therein a mixture of said cyclododecatriene-1,5,9 with 2.5% by weight of hydroperoxy-cyclododecatriene, results in the preparation, in similar manner, of cyclododecane and cyclododecanol, the latter being 2.3% by weight of the sum of the two. Thus, an equimolar amount of cyclododecanol is produced from the hydroperoxy-cyclododecatriene. (Hydroperoxy-cyclodecatriene is also named 3-hydroperoxy-cyclododecatriene-(1,5,9).)

The following examples are representative of the prior art and as such are presented for purposes of comparison.

Example 6.—Repeating the procedure of Example 3, but substituting for the catalyst therein a supported catalyst containing 8% by weight (based on the total supported catalyst weight) of nickel on silica gel (internal surface of 250 m.²/g.), results in a hydrogenation product containing 96% cyclododecane.

Example 7.—Repeating the procedure of Example 3, but substituting for the catalyst therein a supported catalyst containing 9% copper, 3% nickel and 0.4% chromium (percentages by weight based on the total weight supported catalyst) on silica gel (internal surface of 250 m.²/g.), results in a hydrogenation product containing 95.5% cyclododecane.

Example 8.—Repeating the procedure of Example 3, but substituting for the catalyst therein a supported catalyst containing 8% by weight, based on the total weight of the supported catalyst, of nickel on granulated kieselguhr (internal surface of 8 m.²/g.), results in a hydrogenation product containing 97.5% cyclododecane.

Example 9.—Repeating the procedure of Example 3, but substituting for the catalyst therein a supported catalyst containing 8% by weight, based on the total weight of the supported catalyst, of nickel on pumice (internal surface of 1.5 m.²/g.), results in a hydrogenation product containing 98% cyclododecane.

Example 10.—Repeating the procedure of Example 1, but substituting for the catalyst therein a supported catalyst containing 15% by weight, based on the total weight of the supported catalyst, of nickel on aluminum oxide (internal surface of 80 m.²/g.), results in a hydrogenation product containing about 80% by weight of cyclododecane and over fifty different isomerization products and by-products.

Comparing Examples 6–10 with Example 3, it is abundantly clear that the critical surface area of the catalyst support controls the purity of the final product.

The preceding examples can be repeated with similar success by substituting the generically and specifically described reactants and operating conditions of this invention for those used in the preceding examples. In particular, the advantages of employing a support having a surface area of 0.01–1 m²./g. are found when substituting the kieselguhr support of Examples 1–5 with supports made of aluminum oxide, baked clay, precipitated silicic acid, pumice, bentonite, etc., having substantially the same internal surface area.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence.

What is claimed is:

1. A supported hydrogenation catalyst consisting essentially of a support of kieselguhr sintered at a sufficiently high temperature for a sufficient period of time so that said support has an internal surface area of from 0.01 to less than 1 square meter per gram and of nickel from 0.1 to 30 percent by weight based on the total weight of the supported catalyst.

2. A catalyst as defined by claim 1 wherein said internal surface is 0.05–0.9 m.²/g.

3. In a gas phase process for catalytically hydrogenating a cycloolefin of more than 8 carbon atoms to form the corresponding cycloparaffin, the improvement which comprises employing a catalyst as defined by claim 1.

4. In a gas phase process for catalytically hydrogenating a cycloolefin of more than 8 carbon atoms to form the corresponding cycloparaffin, the improvement which comprises employing a catalyst as defined by claim 2.

5. A hydrogenation according to claim 3 wherein said cycloolefin compound is monocyclic.

6. A hydrogenation according to claim 3 wherein said cycloolefin compound has in excess of one ethylenic ring double bond.

7. A hydrogenation according to claim 3 wherein said cycloolefin compound is cyclododecatriene-1,5,9.

8. A hydrogenation according to claim 3 wherein said cycloolefin compound is a bicyclic compound.

9. A hydrogenation according to claim 3 wherein the nickel content of the supported catalyst is about 8 percent by weight.

10. A catalyst as defined by claim 1 wherein said internal surface is 0.2–0.7 m.²/g.

11. In a gas phase process for catalytically hydrogenating a cycloolefin of more than 8 carbon atoms to form the corresponding cycloparaffin, the improvement which comprises employing a catalyst as defined by claim 10.

12. A process as defined by claim 3 wherein hydrogenating is conducted at 2–30 atmospheres absolute.

References Cited

UNITED STATES PATENTS

| | | | |
|---|---|---|---|
| 3,207,702 | 9/1965 | Flank | 252—459 |
| 3,235,512 | 2/1966 | Koepernik | 252—459 |
| 3,162,606 | 12/1964 | Giraihs | 252—459 |
| 3,108,142 | 10/1963 | Reppe | 260—666 |
| 3,186,956 | 6/1965 | Cabbage | 252—459 |
| 3,297,564 | 1/1967 | Peck | 252—459 |
| 3,184,414 | 5/1965 | Koch | 252—459 |
| 2,766,301 | 10/1956 | Büchaer | 252—459 |
| 3,010,915 | 11/1961 | Buell | 252—459 |
| 2,938,933 | 5/1960 | Robinson | 260—667 |
| 2,571,953 | 10/1951 | Shapleigh | 252—459 XR |
| 2,955,090 | 10/1960 | Richards | 252—459 |
| 3,193,491 | 7/1965 | Cramer | 252—459 |
| 3,271,323 | 9/1966 | Whitemore | 252—459 |
| 3,417,030 | 12/1968 | O'Hara | 252—459 |
| 3,308,070 | 3/1967 | Miller | 252—459 |
| 3,296,325 | 1/1967 | Gross | 252—459 |
| 2,658,875 | 11/1953 | Schuit | 252—459 |
| 2,515,279 | 7/1950 | Van Der Hoeven | 260—667 |
| 3,285,983 | 11/1966 | Arrigo. | |
| 3,251,892 | 5/1966 | Seefelder. | |

FOREIGN PATENTS

| | | |
|---|---|---|
| 36/23,475 | 1961 | Japan. |
| 1,129,771 | 1962 | Germany. |

OTHER REFERENCES

Robert B. Anderson et al.: Ind. & Eng. Chem., vol. 40, No. 12, pp. 2347, 2350, 1948.

DELBERT E. GANTZ, Primary Examiner

V. O'KEEFE, Assistant Examiner

U.S. Cl. X.R.

252—459